United States Patent [19]

Wilson

[11] Patent Number: 4,796,375
[45] Date of Patent: Jan. 10, 1989

[54] SUB-SURFACE GAME FISHING LURE

[76] Inventor: Geoff Wilson, 187 Solar Drive, Whittington, 3219 Victoria, Australia

[21] Appl. No.: 68,621

[22] Filed: Jul. 1, 1987

[30] Foreign Application Priority Data

Jul. 7, 1986 [AU] Australia .......................... 59789/86

[51] Int. Cl.⁴ ............................................ A01K 85/00
[52] U.S. Cl. ................................ 43/42.05; 43/42.45; 43/42.48; 43/42.36
[58] Field of Search ................. 43/42.45, 42.05, 42.36, 43/42.48

[56] References Cited

U.S. PATENT DOCUMENTS

| D. 159,402 | 7/1950 | Algier | 43/42.48 |
|---|---|---|---|
| 1,390,458 | 9/1921 | Moree | 43/42.05 |
| 2,184,031 | 12/1939 | Wyatt | 43/42.48 X |
| 2,288,009 | 6/1942 | Matasy et al. | 43/42.36 |
| 2,582,627 | 1/1952 | Gaylord | 43/42.05 |
| 2,778,143 | 1/1957 | Bratz, Sr. | 43/42.05 |

FOREIGN PATENT DOCUMENTS 1422333 11/1965 France ............................. 43/42.36

Primary Examiner—Nicholas P. Godici
Assistant Examiner—Carmine Cuda
Attorney, Agent, or Firm—Fleit, Jacobson, Cohn & Price

[57] ABSTRACT

A lure for sub-surface fishing is disclosed, to be trolled behind a boat or the like, the lure having a main body corresponding to the general shape of a fish, the lure is designed such that its point of tow is displaced from the front end or nose, whereby to ensure that the lure body is maintained in a submerged state during towing or trolling.

8 Claims, 2 Drawing Sheets

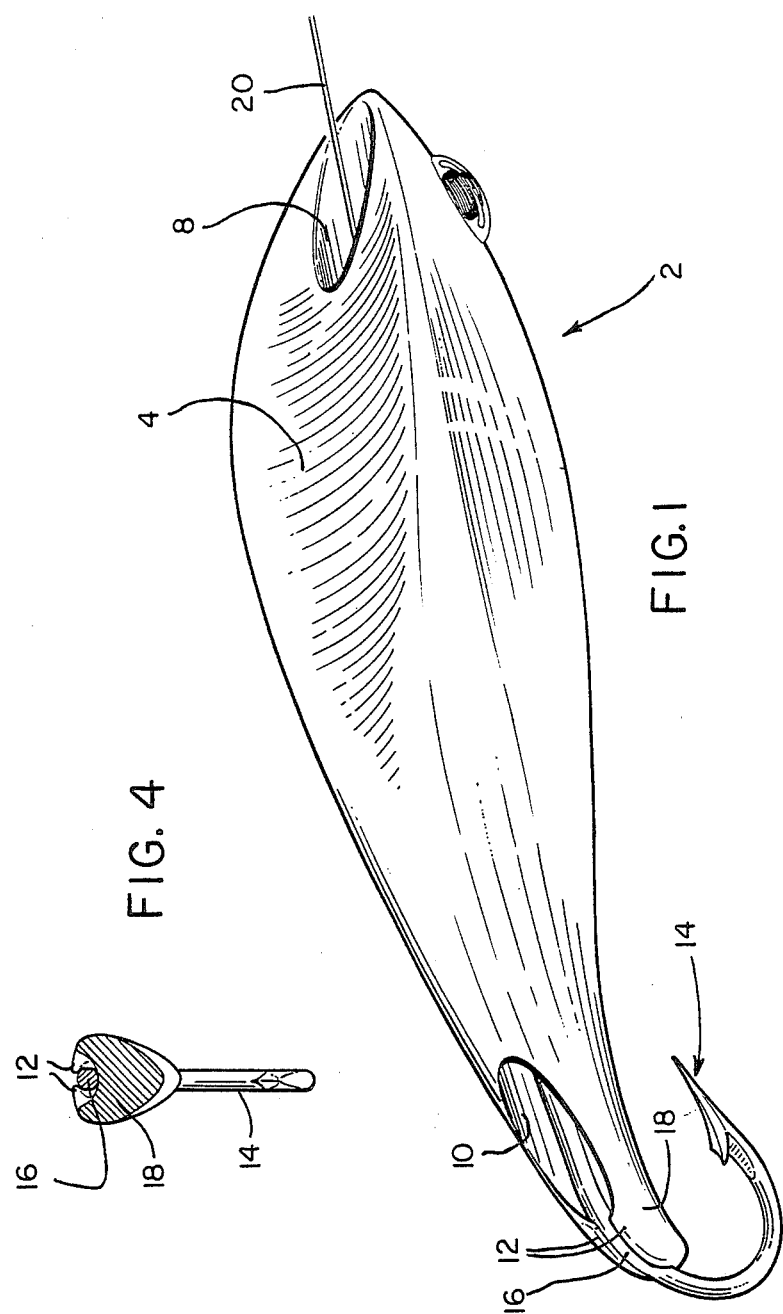

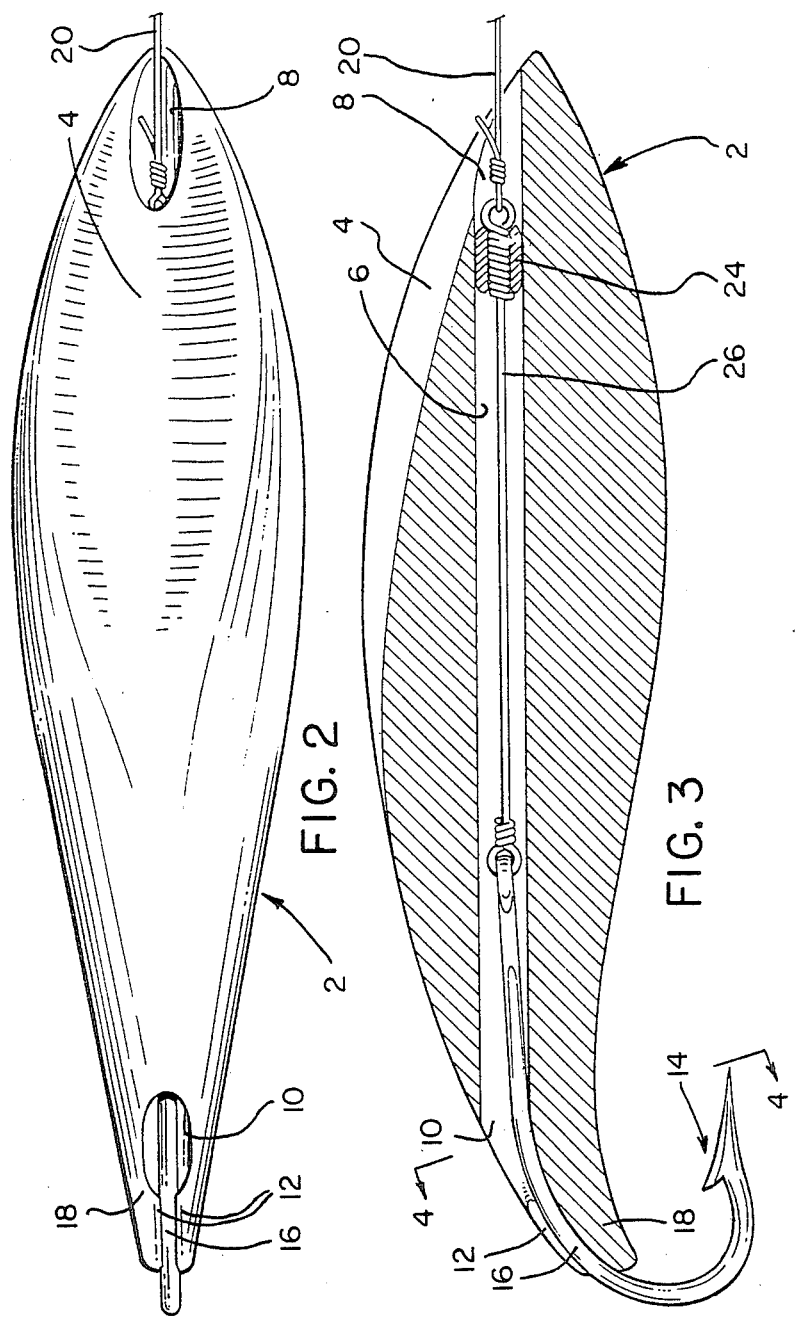

SUB-SURFACE GAME FISHING LURE

The present invention relates, in general, to improvements in game fishing lures and relates more particularly, but not exclusively, to an improved form of sub-surface lure for use by game fishermen. In this regard it should be realized that the expression "sub-surface lure" as used throughout this specification is intended to refer to a lure which, when towed, is adapted to travel entirely beneath the surface of the water, in marked contrast to other game-fishing lures currently available which, by their very design, spend a substantial amount of time travelling across the surface of the water and only dive and travel beneath the surface for short periods of time. Game fishing lures of the type currently in use can therefore be seen to suffer from the disadvantage of reduced effectiveness in attracting large game fish, by reason of this somewhat erratic or sporadic surface and submerged travel.

The principal aim of a game fishing lure is, of course, to attract fish thereto. In accordance with the known art there are two possible forms of "lure" used for purposes of game fishing. One possibility is of course to use live bait, in the form, for example, of any one or more various small species of fish, such as striped tuna and frigate mackerel, to be trolled behind a boat or the like. Such a possibility, however, has been found in a practical sense to suffer from a number of disadvantages. First of all it should be realised that fish of the type suitable for use as live bait need not always be readily available. Secondly, and because when such small fish are used as live bait then the hook is tied to the head of the fish used as bait, in a practical sense the rate or frequency of conversion of strikes to fish actually hooked and landed has been found to be rather poor. Such is the case because of the fact that many game fish strike at the tail of the bait in an attempt to disable it. With live troll baits, however, when a mutilated fish is found to proceed at much the same speed as before, then the game fish frequently appears to lose interest and the bait is ruined for no result. Thirdly, and since the hook is usually attached to the bait fish by threading a needle through its eye sockets to establish a tow point, such is considered by many these days to constitute an act of cruelty. There exists every likelihood that, perhaps in the not too distant future, such acts will be effectively banned.

The alternative is of course to provide an artificial lure. Lures of the type currently in use achieve a certain degree of sub-surface attitude and hence sporadic fish enticing action by means of a bib, or bib-like appendage, located at the front of the lure itself. Such an arrangement has been found to be relatively satisfactory for small sub-surface lures intended to catch smaller type fish. However with lures of a larger size, intended for purposes of attracting larger game fish, and which can therefore be expected to be subjected to much greater stress and strain, such bibbed arrangements have been found to be extremely vulnerable to damage, this nowhere more particularly than on lures of the type which have their point of tow located directly on such a bib.

The present invention can therefore be said to provide a sub-surface game fishing lure, intended primarily for game-fishing off-shore from a boat. In accordance with the invention there is provided a large sub-surface lure effectively imitating one or more of the several small species of tuna now often employed by game fishermen as bait.

In accordance with the present invention, therefore, there is provided a lure for sub-surface game fishing, said lure including: a main body of a shape substantially corresponding to the body shape of a fish, having respective nose and tail ends, said main body having a channel extending substantially from end to end therethrough, said channel being adapted, in use, to receive and retain a steel shaft and attached hook, wherein the front or leading end of said channel is displaced from said nose end of said lure body such that the point of tow of said lure is similarly displaced from said nose end, thereby assisting in maintaining the lure body in a submerged state during towing or trolling.

In order that the invention may be more clearly understood and put into practical effect reference will now be made to a preferred embodiment of a subsurface game-fishing lure in accordance with the invention.

The ensuing description is given by way of non-limitative example only and is with reference to the accompanying drawings wherein:

FIG. 1 is a perspective view of a sub-surface game fishing lure in accordance with the invention;

FIG. 2 is a top plan view of the arrangement of FIG. 1;

FIG. 3 is a side elevation, in section, of the arrangement of FIG. 1; and

FIG. 4 is a view taken along the line 4—4 of FIG. 3.

As illustrated a sub-surface lure in accordance with the present invention includes a main lure body 2 constructed of any suitable material, as for example a plastics material. In an especially preferred embodiment so-called ABS plastic, or metallised plastic, is employed. The metallising of the plastics material has been found to impart a substantially shiny finish thereto, thereby assisting in the attraction of game fish to the lure itself. It should be realised, however, that the lure in accordance with the present invention is not to be considered to be restricted to being constructed of such a material. In a practical sense a number of other materials present themselves, as for example perhaps aluminum, timber or the like.

The body 2 of the lure is preferably so shaped as to approximate the shape of a live fish such as, for example, striped tuna or frigate mackerel of the type commonly employed as troll baits by game fishermen. The reason for such a shape, in terms of effectiveness, should be self-evident.

The body 2 as illustrated includes what might be termed a shaped recess 4, thereby exhibiting a concave anterior dorsal surface. Such a recess or surface 4 acts to direct a concentrated flow of water over the lure body 2 as it is being towed, thereby helping to keep the lure continuously below the surface of the water (in contrast to prior art lures, as described earlier in this specification).

The lure body 2 includes a single, unitary channel 6 extending therethrough, such channel 6 being sufficiently large not only to allow for the passage of a trace or leader 20 but, at the same time, to accommodate spacer 24 and a substantially rigid shaft member 26 to which both the leader 20 and hook 16 are attached in the appropriate order. The lure body 2 therefore includes front opening 8, rear opening 10 and an interconnecting channel 6 sufficiently large to accommodate spacer 24, shaft 26 and hook 16, and to permit the lure body 2 to slide back up the leader 20 and away from the hook 16 once a fish has become hooked. Such a feature has been found, in practice, to eliminate the problem of the lure body 2 levering against the hook 16 in the jaw of a fish, thereby perhaps ultimately assisting in the escape of the fish.

In accordance with the present invention the arrangement is such that the hook, generally designated 16, remains in a substantially fixed position relative to the body 2 of the lure at all times until a fish actually strikes the lure, thereby ensuring that the point 14 of the hook 16 is at all times aligned with the body 2 of the lure and not pendulous thereof, in marked contrast to hooks used on prior art lures. With such an arrangement the point 14 of the hook 16 is much less likely to be deflected as a fish strikes the lure, thereby increasing the chances of a successful catch. In order to achieve this result the lure body 2 in accordance with the invention incorporates a turned down tail section 18 having rear opening 10 formed therein. As illustrated in FIGS. 1 and 4, for instance, the tail 18 of the lure body 2, in the vicinity of the rear opening 10, includes two flaps 12 thereby forming a groove or slot of a size substantially complementary to the shank portion of the hook 16. The flaps 12 serve to allow the hook 16 to be located relative to the lure body 2 in a snap-fit or pressure-fit type arrangement. Upon being "taken" by a fish, the hook 16 can be readily removed from its snap-fit position, thereby running "free". There may also be provided a ramp on each side of the rear opening 10, intended to deflect the eye of a hook 16 upwardly as it is pulled free of the lure so that the hook 16 cannot jam in the narrowed portion of the rear opening 10 designed to receive the shank of the hook (when the hook is not in use).

The principle of operation of the lure in accordance with the present invention, and the advantages such an arrangement exhibits over the known art, will now be explained in more detail hereinafter.

First of all, a lure in accordance with the present invention, in contrast to the prior art, has no bib or bib-like appendage, and in fact can be said to achieve its sub-surface attitude through a combination of three features, namely:

(a) as a result of the provision of a concave anterior dorsal surface, which serves to direct a concentrated flow of water over the top of the lure body 2 as it is being towed, thereby helping to keep the lure submerged;

(b) since point of tow is actually physically removed a short distance back from the "nose" of the lure, then the line of draw subtends an angle of several degrees to the axis of the lure, thereby causing the lure to dive down or submerge when it is pulled forward; and (c) preferably a weight is located inside the lower front half of the lure, so that the lure, although maintaining slightly positive buoyancy at rest, will remain in an upright position with the "nose" inclined downwardly to further induce submerging, then maintain such a sub-surface attitude during towing.

In general terms a lure in accordance with the present invention differs from the prior art in that the point of tow is removed somewhat from the "nose" of the lure, and the or each hook is not a permanent fixture on the lure body. Preferably a lure in accordance with the invention should be trolled at approximately six knots, although in a practical sense the lure has been found to be satisfactory for use over a wide range of trolling speeds. Again preferably so-called out-riggers and down-riggers may be employed in conjunction with a lure in accordance with the present invention, if a spread lure pattern is desired, but it should be understood that any release clips to be employed must be of the adjustable type, since the "hold" on the lure of the present invention is somewhat heavier than most other lures.

In the arrangement as illustrated the steel shaft 26 and associated spacer 24 function or serve to displace the tie-off point for the trace or leader 20 from the eye of the hook 16, and furthermore to extend that tie-off point forward to, and centralize the tie-off point at, the front opening 8 of the channel. Such a construction or configuration avoids the necessity of having the trace or leader extend into the channel back to the eye of the hook, thereby avoiding exposure of the trace or leader to wear and tear by the action of the lure as it is being towed through the water.

Finally, it is to be understood that the aforegoing description refers merely to preferred embodiments of the invention, and that variations and modifications will be possible thereto without departing from the spirit and scope of the invention, the ambit of which is to be determined from the following claims.

I claim:

1. A lure for sub-surface game fishing, said lure including:
    a main body of a shape substantially corresponding to the body shape of a fish, having respective front or nose and rear or tail ends, said main body having a single, unitary channel extending substantially from end to end therethrough,
    a hook received and retained in said channel,
    a substantially rigid member, extending within said channel between said nose and tail ends, wherein the front or leading end of said channel is displaced from said nose end of said main body such that the point of tow of said lure is similarly displaced from said nose end, said main body further including a shaped recess towards the front or nose end thereof, said recess forming a concave anterior dorsal surface for said main body, the arrangement being such that said main body is maintained substantially continuously beneath the surface of the water, in a submerged state, during towing or trolling, and wherein said main body includes, at or in the vicinity of the rear or tail end thereof, means for receiving and releasably retaining the hook relative to said main body, the arrangement being such that the hook is attached by the substantially rigid member to a trace or leader and is held substantially fixed relative to said main body until such time as the hook is taken by a fish.

2. The lure as claimed in claim 1, wherein said main body is constructed wholly or in part of a plastics material.

3. The lure as claimed in claim 2, wherein said plastics material is ABS plastic.

4. The lure as claimed in claim 2, wherein said plastics is a metallised plastics material.

5. The lure as claimed in claim 1, wherein said receiving and retaining means for said hook is in the form of a shaped slot or groove at or adjacent to the rear or tail end of said main body, said slot or groove being of a dimension substantially the same as a shank portion of said hook but being partially closed by a plurality of flaps, whereby to provide a retaining recess for said shank of said hook.

6. The lure as claimed in claim 5, wherein said main body includes a weight of predetermined magnitude at the lower front end thereof, said weight serving further to maintain the main body in a continuously submerging state during towing or trolling.

7. The lure as claimed in claim 1, wherein said hook has associated therewith said substantially rigid member and a spacing means, serving to displace the tie-off point for the trace or leader from the eye of said hook, and to extend it forward to, and centralize it at, the front opening of said channel.

8. The lure as claimed in claim 7, wherein said channel allows the main body, in use, to slide along said trace or leader.

* * * * *